(12) United States Patent
Lee (10) Patent No.: US 10,673,293 B2
(45) Date of Patent: Jun. 2, 2020

(54) ELECTRIC MACHINE WITH VARIABLE CROSS SECTION STATOR WINDINGS

(71) Applicant: BorgWarner Inc., Auburn Hills, MI (US)

(72) Inventor: Seong Taek Lee, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 88 days.

(21) Appl. No.: 15/812,282

(22) Filed: Nov. 14, 2017

(65) Prior Publication Data

US 2019/0149001 A1    May 16, 2019

(51) Int. Cl.
*H02K 3/12* (2006.01)
*H02K 3/28* (2006.01)

(52) U.S. Cl.
CPC ............. *H02K 3/12* (2013.01); *H02K 3/28* (2013.01)

(58) Field of Classification Search
CPC .. H02K 3/12; H02K 3/28; H02K 3/14; H02K 3/48; H02K 3/50; H02K 3/505
USPC .................................................. 310/201, 198
See application file for complete search history.

(56) References Cited

U.S. PATENT DOCUMENTS

| 7,034,428 B2 | 4/2006 | Cai et al. | |
| 8,789,259 B2 | 7/2014 | Stephenson | |
| 2001/0011851 A1 | 8/2001 | Asao et al. | |
| 2005/0116573 A1 | 6/2005 | Hattori et al. | |
| 2012/0326552 A1 | 12/2012 | Kinpara et al. | |
| 2013/0026875 A1* | 1/2013 | Hao | H02K 3/12 310/198 |
| 2013/0049514 A1* | 2/2013 | Ikuta | H02K 3/38 310/195 |
| 2015/0280503 A1* | 10/2015 | Takahashi | H02K 3/12 310/201 |
| 2016/0036277 A1 | 2/2016 | Lynch et al. | |

* cited by examiner

*Primary Examiner* — Michael Andrews
(74) *Attorney, Agent, or Firm* — Bose McKinney & Evans LLP (57) ABSTRACT

An electric machine including a rotor operably coupled with a stator having a plurality of stator windings. Each stator winding defines has a plurality of axially extending segments disposed within the stator slots and a plurality of end turn segments. At least one first axially extending segment defining a first cross sectional area and at least two second axially extending segments defining a smaller second cross sectional area are disposed in each of the stator slots. At least one of the plurality of end turn segments conductively couples a single first axially extending segment in a first one of the plurality of slots to at least two second axially extending segments in a second one of the plurality of slots. In some embodiments, the larger first axially extending segments are all disposed radially outwardly of the smaller second axially extending segments. The windings may be formed using hairpin conductors.

8 Claims, 6 Drawing Sheets

ELECTRIC MACHINE WITH VARIABLE CROSS SECTION STATOR WINDINGS

BACKGROUND

The present invention relates to electric machines.

There is an increasing demand for compact and efficient electric machines. One factor influencing the efficiency of an electric machine is the winding density within the stator slots of the electric machines. An electric machine having a relatively high winding density, often referred to as a high slot fill factor, will generally be more efficient.

One method for enhancing the density of the stator windings is to use hairpin conductors which have a pair of legs that are inserted into the slots of the stator core. The free ends of the hairpin conductors are then welded to adjacent hairpin conductors to define a stator winding. The use of such hairpin conductors having a rectangular cross section can be used to achieve a relatively high slot fill factor.

The use of hairpin conductors, however, can be complex to manufacture, requiring the individual hairpin conductors to be inserted into slots and formed into the proper shape. Most significantly, the use of hairpin conductors also results in the need to weld each of the individual legs of the hairpin conductors to adjacent conductors to form a continuous stator winding. To reduce manufacturing costs, the cross sectional size of the hairpin conductors can be increased to reduce the number of conductors and thereby reduce the number of welds and assembly requirements.

While increasing the cross sectional size of the individual conductors reduces the number of welds, it may also have unwanted consequences. More specifically, when the electric machine is operating at a high speed and generating an oscillating, high frequency, AC current, the conductors are subjected to what is commonly referred to as the skin effect with only that portion of the conductor near the outer surface of the conductor conducting electrical current. In such circumstances, the center portion of the conductor does not conduct any meaningful electrical current. The effect is sometimes referred to as "AC copper loss" because when the conductor is formed out of copper, the copper material in the center of the conductor is not effective in conducting electrical current.

An electric machine design which reduces such copper losses while also being capable of being manufactured in a cost efficient manner is desirable.

SUMMARY

The present invention provides an electric machine having stator windings with at least two different cross sections to thereby balance the tradeoffs between copper losses and manufacturing complexity.

The invention comprises, in one form thereof, an electric machine that includes a rotor operably coupled with a stator wherein the stator includes a stator core defining a plurality of axially extending slots and a plurality of stator windings. Each stator winding defines a continuous electrical conductor having a plurality of axially extending segments with each of the axially extending segments being disposed within one of the slots and a plurality of end turn segments connecting a pair of the axially extending segments disposed in separate slots. At least one first axially extending segment and at least two second axially extending segments are disposed in each of the plurality of slots with the first axially extending segment in each of the plurality of slots defining a first cross sectional area and the second axially extending segments in each of the plurality of slots defining a second cross sectional area wherein the first cross sectional area is larger than the second cross sectional area. At least one of the plurality of end turn segments conductively couples a single first axially extending segment in a first one of the plurality of slots to at least two second axially extending segments in a second one of the plurality of slots.

In some embodiments, the first axially extending segments are disposed radially outwardly of the second axially extending segments in each of the plurality of slots.

In some embodiments, the plurality of windings define only two different cross sectional areas.

In some embodiments, each of the plurality of windings are defined by a plurality of hairpin conductors wherein the hairpin conductors each have a central portion defining one of the end turn segments and a pair of opposing legs extending from the central portion. Each of the opposing legs defines one of the axially extending segments and a free end wherein the free end defines a portion of an end turn segment such that the free ends of adjacent hairpin conductors are welded together to define one of the plurality of end turn segments. In some embodiments having such hairpin conductors, each hairpin conductor has a consistent cross sectional area for its entire length and the at least one end turn segment is formed by welding a free end of a first hairpin conductor configured to define the first cross sectional area to two free ends of second hairpin conductors which each are configured to define the second cross sectional area.

In some embodiments, the plurality of windings define only two different cross sectional areas and there are two second axially extending segments for each first axially extending segment in each of the plurality of slots. In such an embodiment, the windings may be arranged such that the first axially extending segments are disposed radially outwardly of the second axially extending segments in each of the plurality of slots.

In some embodiments, each of the axially extending segments define a cross section having four major edges wherein the four major edges define two pair of parallel edges wherein the two pairs of edges are disposed at a right angle to each other.

The invention comprises, in another form thereof, an electric machine that includes a rotor operably coupled with a stator wherein the stator includes a stator core defining a plurality of axially extending slots and a plurality of stator windings. Each stator winding defines a continuous electrical conductor having a plurality of axially extending segments with each of the axially extending segments being disposed within one of the slots and a plurality of end turn segments connecting a pair of the axially extending segments disposed in separate slots. Each stator winding defines at least first and second wraps wherein each of the first and second wraps circumscribes the stator core. At least one first axially extending segment and a plurality of second axially extending segments are disposed in each of the plurality of slots with the first axially extending segment in each of the plurality of slots defining a first cross sectional area and the second axially extending segments in each of the plurality of slots defining a second cross sectional area wherein the first cross sectional area is larger than the second cross sectional area. For each of the plurality of windings, an end turn segment disposed between the first and second wraps of the respective winding conductively couples a single first axially extending segment in a first one of the plurality of slots to at least two second axially extending segments in a second one of the plurality of slots. The first wrap is defined by a single elongate conductor configured to define the first cross sectional area and the second wrap is defined by a plurality of elongate conductors each configured to define the second cross sectional area with the plurality of elongate conductors extending adjacent to each other to define the second wrap.

In some embodiments, each of the plurality of windings are defined by a plurality of hairpin conductors wherein the hairpin conductors each having a central portion defining one of the end turn segments, and a pair of opposing legs extending from the central portion. Each of the opposing legs defines one of the axially extending segments and a free end. The free ends each define a portion of an end turn segment with the free ends of adjacent hairpin conductors being welded together to define one of the plurality of end turn segments. In some embodiments having such hairpin conductors, each hairpin conductor has a consistent cross sectional area for its entire length and the end turn segment disposed between the first and second wraps of the respective winding is formed by welding a free end of a first hairpin conductor configured to define the first cross sectional area to a plurality of free ends of second hairpin conductors which are each configured to define the second cross sectional area. Such an embodiment may also be arranged such that the first axially extending segments are disposed radially outwardly of the second axially extending segments in each of the plurality of slots.

In some variants of the electric machine having hairpin conductors, the plurality of windings may define only two different cross sectional areas with there being two second axially extending segments for each first axially extending segment in each of the plurality of slots and wherein the end turn segment disposed between the first and second wraps of each of the respective windings conductively couples the single elongate conductor defining the first cross sectional area to two elongate conductors defining the second cross sectional area.

In some variants of the electric machine having hairpin conductors, each of the axially extending segments define a cross section having four major edges wherein the four major edges define two pair of parallel edges wherein the two pairs of edges are disposed at a right angle to each other.

The invention comprises, in still another form thereof, an electric machine that includes a rotor operably coupled with a stator wherein the stator includes a stator core defining a plurality of axially extending slots and a plurality of stator windings. Each stator winding defines a continuous electrical conductor having a plurality of axially extending segments with each of the axially extending segments being disposed within one of the plurality of axially extending slots and a plurality of end turn segments connecting a pair of the axially extending segments disposed in separate slots. At least one first axially extending segment and at least two second axially extending segments are disposed in each of the plurality of slots with the first axially extending segment in each of the plurality of slots defining a first cross sectional area and the second axially extending segments in each of the plurality of slots defining a second cross sectional area wherein the first cross sectional area is larger than the second cross sectional area. Each of the axially extending segments define a cross section having four major edges wherein the four major edges define two pair of parallel edges wherein the two pairs of edges are disposed at a right angle to each other and the first axially extending segments are disposed radially outwardly of the second axially extending segments in each of the plurality of slots.

In some embodiments, each of the plurality of windings are defined by a plurality of hairpin conductors wherein the hairpin conductors each have a central portion defining one of the end turn segments and a pair of opposing legs extending from the central portion. Each of the opposing legs defining one of the axially extending segments and a free end. The free ends each define a portion of an end turn segment with the free ends of adjacent hairpin conductors being welded together to define one of the plurality of end turn segments.

In some embodiments having such hairpin conductors, each hairpin conductor has a consistent cross sectional area for its entire length and each of the stator windings includes at least one end turn segment that is formed by welding a free end of a first hairpin conductor configured to define the first cross sectional area to two free ends of second hairpin conductors which are each configured to define the second cross sectional area. In such an embodiment, the plurality of windings may define only two different cross sectional areas with there being two second axially extending segments for each first axially extending segment in each of the plurality of slots.

In another variant of such an embodiment having hairpin conductors, the first and second cross sectional areas may define a common circumferential width with each slot having a circumferential width less than twice the common circumferential width of the first and second cross sectional areas.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 1:
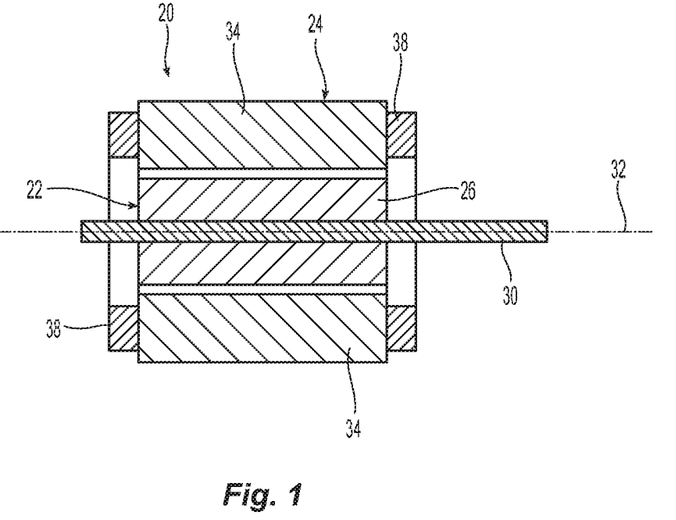
FIG. 1 is a schematic cross sectional view of an electric machine.

An electric machine 20 is schematically depicted in FIG. 1 and includes a rotor 22 operably coupled with a stator 24.

Rotor 22 includes a rotor core 26 and a plurality of permanent magnets 28. Rotor core 26 is mounted on rotor shaft 30 whereby rotor 22 rotates about axis 32.

Figure 2:
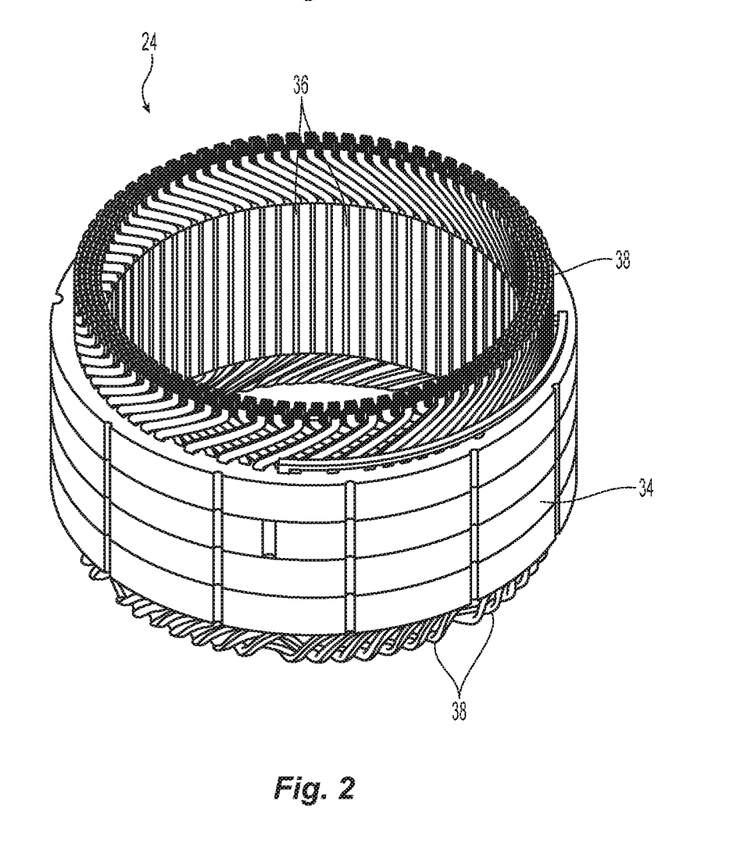
FIG. 2 is a perspective view of stator.

A stator 24 is shown in FIG. 2 and includes a stator core 34 defining a plurality of axially extending slots 36 and a plurality of stator windings 38.

Each stator winding 38 defines a continuous electrical conductor having a plurality of axially extending segments 42 with each of the axially extending segments 42 being disposed within one of the slots 36 and a plurality of end turn segments 44 connecting a pair of the axially extending segments 42 disposed in separate slots 36.

Figure 3:
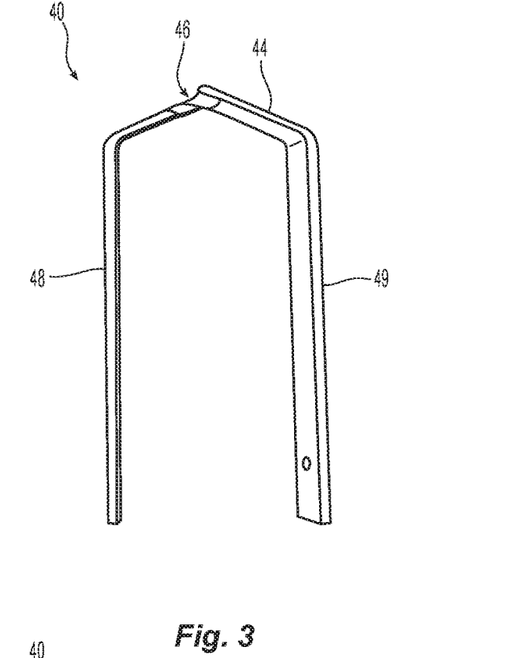
FIG. 3 is a view of a hairpin conductor having an end turn formed therein.

In the illustrated embodiment, the stator windings 38 are formed by using a plurality of hairpin conductors 40, 41 which are welded together to form a continuous electrical conductor that functions as a stator winding 38. Hairpin conductors 40, 41 are best understood with reference to FIGS. 2-4, 11 and 12. In the illustrated embodiment, each of the hairpin conductors starts out as a linearly extending copper wire having a substantially rectangular cross section. FIG. 3 shows a hairpin conductor 40 after it has been formed such that a central portion 46 defines an end turn segment 44 with a pair of opposing legs 48, 49 extending from central portion 46. After forming the hairpin conductor 40 into the shape shown in FIG. 3, the opposing legs 48, 49 are inserted through two separate slots 36.

Figure 4:
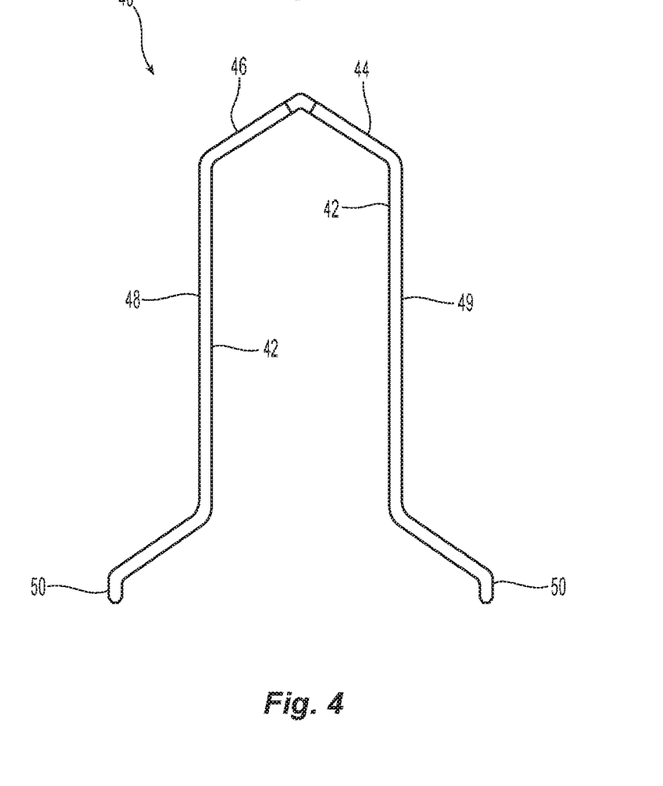
FIG. 4 is a view of the hairpin conductor of FIG. 3 after bending the free ends thereof into their final shape.

After inserting opposing legs 48, 49 into slots 36, the opposing legs 48, 49 are then bent to define an axially extending segment 42 and a free end 50. The free ends 50 each defines one half of an end turn segment 44 such that the free ends 50 of adjacent hairpin conductors 40 are welded together to define one of the end turn segments 44 and conductively connect the hairpin conductors that were welded together. Hairpin conductors 41 are shaped in the same manner as hairpin conductors 40 but have a small cross section as will be further discussed below.

Figure 11:
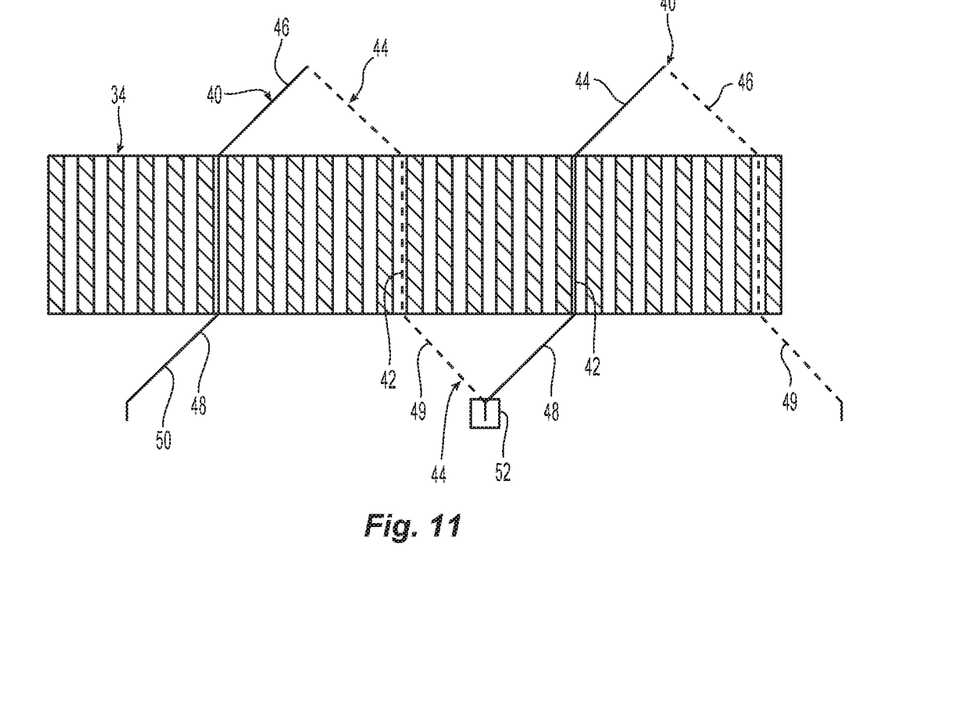
FIG. 11 is a schematic representation of an "unwrapped" stator core and hairpin conductors.

FIG. 11 illustrates how two adjacent hair pin conductors 40 are welded together to form a continuous conductor. In this regard, it is also noted that central portion 46 is not only bent to form an end turn, but is also bent at a perpendicular direction to offset the two opposing legs 48, 49. This allows the two legs 48, 49 of the hairpin conductor to be positioned in two different layers in the stator slots 36 as will be further discussed below. Returning to FIG. 11, it is noted that this figure illustrates two hairpin conductors 40 wherein the free ends 50 of the two different hairpin conductors 40 are joined together with a weld 52. Although FIG. 11 illustrates only two hairpin conductors 40, additional hairpin conductors will be welded to the illustrated hairpin conductors 40 to form an elongate continuous winding 38 as further discussed below. In the illustrated embodiment, all of the hairpin conductors are inserted with their central portion 46 at one end of the stator core 34 and their free ends 50 at the opposite end of the stator core. As a result, all of the welds 50 of the free ends will be on the same axial end of the stator core.

Figure 6:
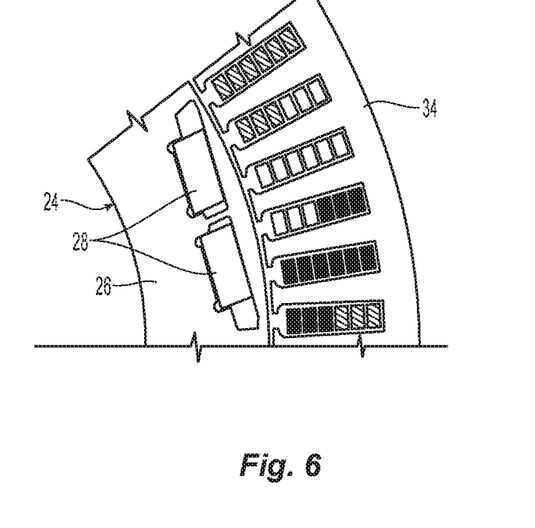
FIG. 6 is a partial top view of an electric machine with six equally sized conductors in each stator slot.
Figure 7:
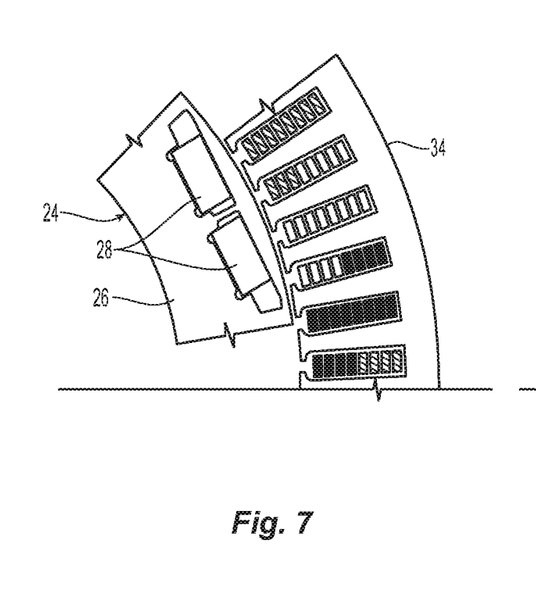
FIG. 7 is a partial top view of an electric machine with eight equally sized conductors in each stator slot.
Figure 8:
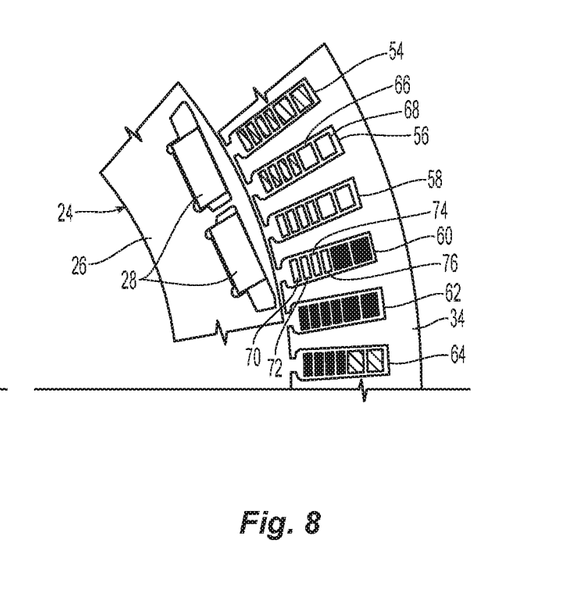
FIG. 8 is a partial top view of an electric machine with six unequally sized conductors in each stator slot.

Electric machine 20 employs stator windings 38 have at least two different cross sectional areas and each of the slots 36 include stator windings 38 having at least two different cross sectional areas. FIGS. 5-10 illustrate how such an arrangement compares to electric machines having stator windings which all have the same cross sectional area. FIGS. 5-8 are partial views of an electric machine having a permanent magnet rotor. Each of the electric machines depicted in FIGS. 5-8 are identical except for the stator windings. FIG. 8 depicts the stator windings of electric machine 20 of FIG. 1 which includes stator windings defining two different cross sectional areas.

Figure 5:
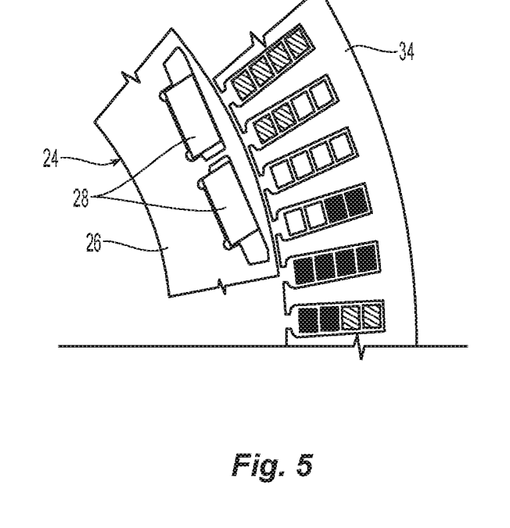
FIG. 5 is a partial top view of an electric machine with four equally sized conductors in each stator slot.

FIG. 5 illustrates an electric machine wherein each stator slot holds four conductors each of which has the same cross sectional area. FIG. 6 illustrates an electric machine wherein each stator slot holds six conductors each of which has the same cross sectional area. FIG. 7 illustrates an electric machine wherein each stator slot holds eight conductors each of which has the same cross sectional area. FIG. 8 illustrates an electric machine wherein each stator slot holds six conductors with two of the conductors having a relatively large cross sectional area which is the same as the conductors in FIG. 5 and four of the conductors having a relatively small cross sectional area which is the same as the conductors of FIG. 7. In FIG. 8, the two larger conductors are located in the two radially outermost layers and the four small conductors are located in the four radially innermost layers.

The electric machines depicted in FIGS. 5-8 all use hairpin conductors to form the stator windings. With regard to the electric machines shown in FIGS. 5-7, the electric machine having four conductors (FIG. 5) will have the fewest required welds, the electric machine with six conductors (FIG. 6) will have 1.5 times the welds of the four conductor electric machine, and the electric machine with eight conductors (FIG. 7) will have double the welds of the four conductor electric machine. The electric machine shown in FIG. 8 has six conductors, however, as further discussed below, the smaller conductors are grouped into two pairs of two and the total number of welding operations required for the embodiment of FIG. 8 is similar to that of the four conductor electric machine.

Figure 9:
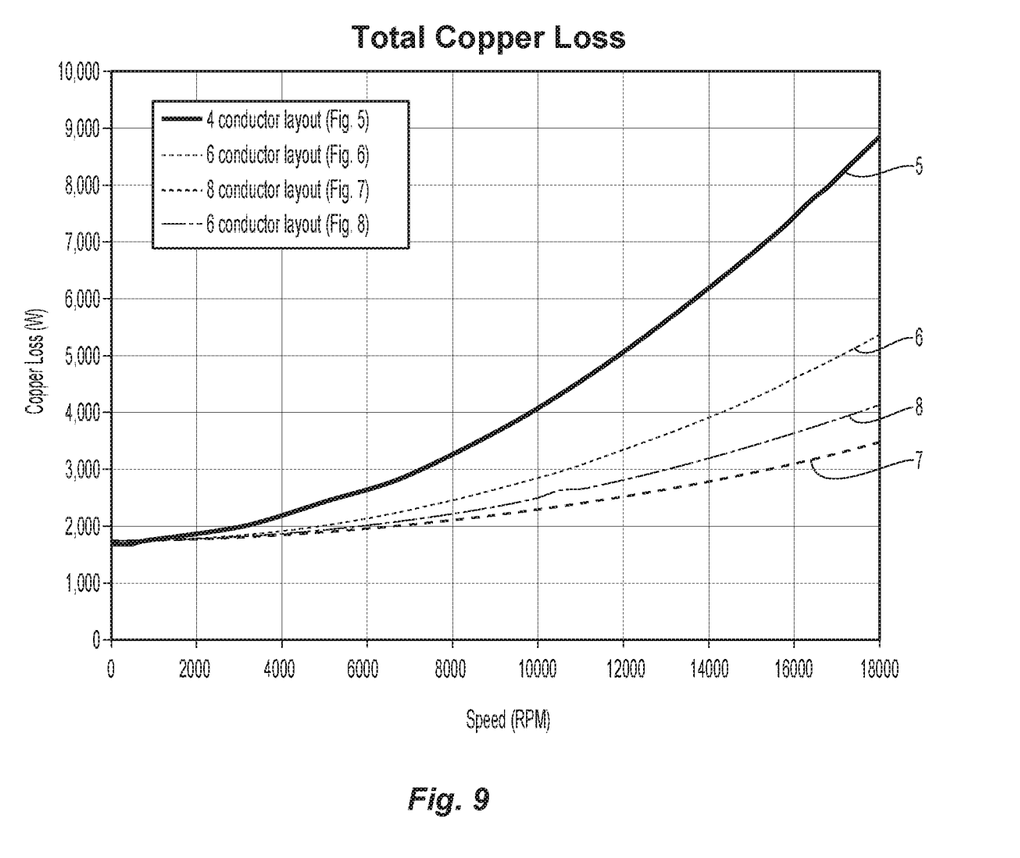
FIG. 9 is a chart illustrating performance characteristics of the electric machines depicted in FIGS. 5-8.

Computer modelling using finite element analysis was used to compare the losses for the electric machines of FIGS. 5-8 due to the skin effect which is also commonly referred to as "AC copper loss" or simply "copper loss." The chart of FIG. 9 displays the results of this analysis with the rotational speed of the electric machine in RPM on the horizontal axis and the copper loss in watts on the vertical axis. As can be seen in FIG. 9, at rotational speeds below 2,000 RPM, the performance curves of the electric machines are tightly grouped. As the speed increases beyond 2,000 RPM, however, the curves begin to diverge. With regard to the chart of FIG. 9, it is noted that the curve identified with reference number 5 corresponds to the electric machine of FIG. 5, the curve identified with reference number 6 corresponds to the electric machine of FIG. 6, the curve identified with reference number 7 corresponds to the electric machine of FIG. 7 and the curve identified with reference number 8 corresponds to the electric machine of FIG. 8.

At 18,000 RPM, the four conductor electric machine (FIG. 5) has a loss of approximately 9,000 W, the six conductor electric machine (FIG. 6) has a loss of approximately 5,300 W, and the eight conductor electric machine (FIG. 7) has a loss of approximately 3,500 W. The embodiment of FIG. 8, with six conductors, two large and four small, has a loss of approximately 4,000 W. Thus, the embodiment of FIG. 8 avoids the large number of welding operations required to manufacture the eight conductor embodiment of FIG. 7 but operates nearly as effectively at high rotational speeds.

The skin effect diminishes as the radial distance from the rotor increases. Thus, by using stator windings having a smaller cross sectional area nearest the rotor and stator windings having a larger cross sectional area positioned radially outwardly of the smaller windings, the number of welding operations can be reduced while still limiting the efficiency losses due to the skin effect.

In the illustrated embodiment, the individual conductors forming the stator windings have an outer insulative layer (not separately depicted in the figures). When using such conductors having an insulative outer layer, the use of fewer conductors minimizes the cross sectional area taken up by the insulation. Thus, because the embodiment of FIG. 8 has fewer conductors than the eight conductor embodiment of FIG. 7, the embodiment of FIG. 8 can fill the slot with a higher percentage of electrically conductive material, e.g., copper, versus electrically insulative material disposed on the outer surface of conductor. The embodiment of FIG. 8 can thereby include a greater cross sectional area of conductive material within the same size slot than the embodiment of FIG. 7. This can provide efficiency advantages when operating the electric machine at lower rotational speeds.

The poles for the different phases are indicated by three different styles of fill, either cross-hatching, no fill or complete fill in FIGS. 5-8 with each of the different phases having its own distinctive fill.

As can be seen in FIG. 8, electric machine 20 is a three phase electric machine and each individual pole of each phase extends over three physical stator slots 36 but does not entirely fill each of these three slots. In FIG. 8, a pole of a first phase extends over slots 56, 58, and 60; a pole of a second phase extends over slots 60, 62 and 64. A portion of a pole of a third phase is defined by slot 64 and a portion of another pole of the third phase is defined by slots 54 and 56.

In the illustrated arrangement, each individual pole completely fills a center slot, fills the two radially outermost layers of the slot positioned adjacently counterclockwise to the center slot, and fills the four radially innermost layers of the slot positioned adjacently clockwise to the center slot. With reference to FIG. 8, an individual pole of one phase is defined by radially outermost conductors 66, 68 in slot 56, all of the conductors in slot 58, and the four radially innermost conductors 70, 72, 74, 76 in slot 60.

As further discussed below, each individual stator winding 38 in electric machine 20 is a continuous conductor that includes a length defined by a relatively large cross sectional area 80 and a length defined by parallel lengths of two conductors having a relatively small cross sectional area 82. The use of hair pin conductors facilitates a relatively high slot fill factor for the stator slots. In other words, a relatively larger percentage of the slot cross section can be filled with conductors when using hairpin conductors. This is because the opposing legs of hair pin conductors can be relatively easily inserted into the slot. The use of hairpin conductors facilitates the use of a conductor having a rectangular cross section which also facilitates obtaining a high slot fill factor. In the illustrated embodiment, the stator windings are formed out hairpin conductors 40, 41 having a generally rectangular cross section wherein the conductors define a cross section having four major edges wherein the four major edges define two pair of parallel edges wherein the two pairs of edges are disposed at a right angle to each other. The corners of the cross section define right angles but may be somewhat rounded to facilitate efficient manufacture. This can be seen in FIG. 10 wherein the larger hairpin conductors 40 defining cross section 80 include a pair of first parallel edges 84 and a pair of second parallel edges 86 wherein edges 84 are disposed perpendicular to edges 86. As also seen in FIG. 10, smaller hairpin conductors 41 define smaller cross sectional areas 82 and have a pair of first parallel edges 88 and a pair of second parallel edges 90 wherein edges 88 are disposed perpendicular to edges 90.

The edges may vary a small amount from this configuration and still be considered to have pairs of parallel edges arranged perpendicular to each other.

Figure 10:
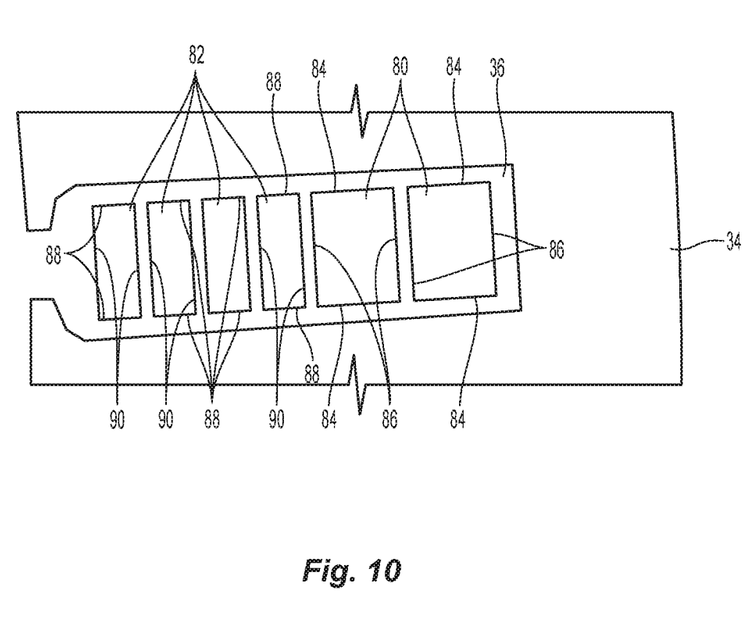
FIG. 10 is an enlarged view of a single stator slot of the electric machine of FIG. 8.

It is also noted that the gaps between individual conductors and between the conductors and the stator core are exaggerated in FIG. 10 to provide greater graphical clarity and enable the viewer to better visualize the individual conductors.

In the illustrated embodiment, the stator windings define only two different cross sectional areas 80, 82. In all of the stator slots 36, the axially extending segments of the conductors having larger cross sectional areas 80 are disposed radially outwardly of the axially extending segments of the conductors having smaller cross sectional areas 82.

As can also be seen in the figures, the illustrated embodiment has hairpin conductors 40, 41 which both define a common circumferential width, i.e., the distance between first edges 84 for cross section 80 is the same as the distance between first edges 88 for cross section 82. The width of the stator slots 36 is only slightly greater than this width, sufficient to allow for the insertion of the conductors. Thus, the illustrated stator slots 36 do not have any conductors positioned side-by-side. Another way of saying this is that slots 36 have a circumferential width that is less than twice the common circumferential width of cross sectional areas 80, 82. Although the illustrated embodiment does not position conductors side-by-side in the slots, alternative embodiments could utilize such an arrangement.

It is also noted that each of the individual hairpin conductors used in electric machine 20 has a consistent cross sectional area 80, 82 for the entire length of that individual hairpin conductor. Because multiple hairpin conductors are welded together to form each stator winding, the cross sectional area of a winding can vary over its length even though the individual hairpin conductors have a consistent cross sectional area.

FIG. 11 illustrates how two hairpin conductors 40 are connected together when forming a stator winding 38. As mentioned above, the opposite legs 48, 49 of an individual hairpin conductor are radially offset such that they are disposed in different layers in slots 36. FIG. 11 is a schematic representation and, for purposes of graphical clarity, only two conductors 40 are shown and the stator core 34 is shown in a linear arrangement as if it had been unwound. Each of the conductor 40 has a leg 48 shown as a solid line and located on the left-hand side of the conductor 40 as shown in FIG. 11 and an opposite leg 49 shown as a dashed line and located on the right-hand side of the conductor 40 as shown in FIG. 11.

Legs 48 of each of the conductors are located in the radially outermost layer of the slots 36 (e.g., reference number 68 in FIG. 8) while legs 49 of each of the conductors are located in the next layer radially inward (e.g., reference number 66 in FIG. 8). Leg 48 of one conductor is connected to leg 49 of another conductor with weld 52. Additional hairpin conductors 40 are similarly connected to the two shown in FIG. 11 such that the resulting winding defines a wrap, i.e., a length of continuous electrical conductor that circumscribes the stator core such that the continuous electrical conductor extends for approximately 360 degrees about axis 32. In the illustrated embodiment, the hairpin conductors are arranged such that all of the free ends that require welding are located on one axial end of the stator core and the central portions 46 of each of the hairpin conductors are located on the opposite axial end of the stator core.

In the illustrated embodiment, for each of the separate windings, at the end of the first wrap, the free end of the conductor 40 is connected to two smaller conductors 41. The smaller conductors 41 are then connected to pairs of smaller conductors 41 such that they form a parallel set of conductors that extend for an entire wrap about the stator core.

Thus, for each of the windings, there is at least one end turn segment that is formed by welding a free end 50 of a hairpin conductor 40 configured to define a relatively large cross sectional area to two free ends of hairpin conductors 41 which each are configured to define a relatively smaller cross sectional area. This is best seen in FIG. 12 wherein each of the dashed boxes represent a weld joining the free ends of two or more conductors.

Figure 12:
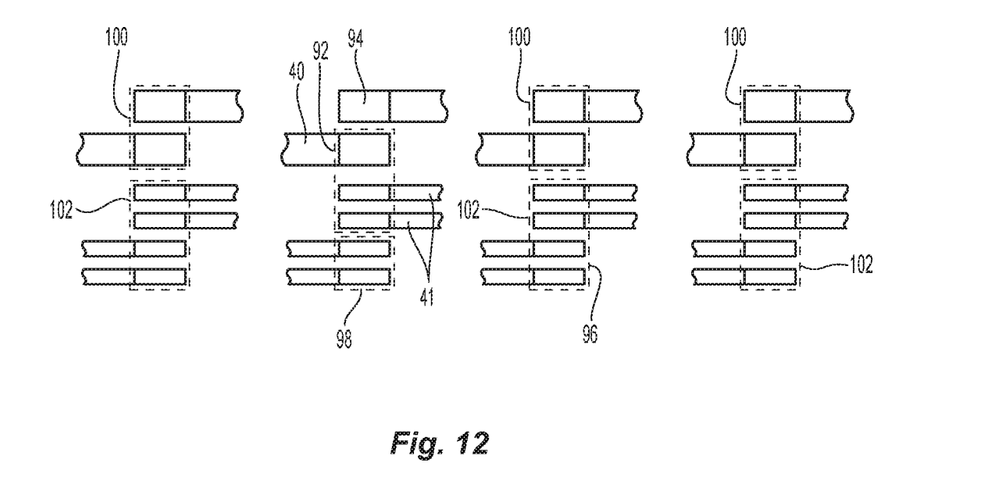
FIG. 12 is a schematic representation of the connections between hairpin conductors forming a stator winding.

FIG. 12 is a schematic representation of a limited number of the free ends of the hairpin conductors. In this view, dashed box 92 represents a weld that joins the terminal end of a wrap formed by large hairpin conductors 40 to the start of a wrap formed by two smaller hairpin conductors 41. Reference number 94 identifies a free end 50 of a hairpin conductor 40 in the radially outermost layer that is not welded to another hairpin conductor and forms the start lead of a winding. This winding circumscribes the stator core from lead 94 to reach the point identified by box 92 where it is connected to two hairpin conductors 41. Lead 94 is connected to an appropriate electrical circuit for proper operation of electric machine 20.

The two hairpin conductors 41 welded at box 92 extend together and have opposite legs that are welded to two additional hairpin conductors 41 as represented by box 96. At box 96, the weld conductively connects the free ends of four hairpin conductors. This process continues until the smaller hairpin conductors 41 circumscribe the stator core to define a second wrap. The resulting winding can be visualized as being formed by a single length of wire wherein the first wrap is defined by the single wire and the second wrap is formed by slicing the wire into two halves and maintaining the two halves next to each other as they form the second wrap about the stator core. In other words, the first wrap is defined by a single elongate conductor configured to define a cross sectional area 80 and the second wrap is defined by a plurality of elongate conductors, two in the illustrated embodiment, each configured to define a cross sectional area 82 with the plurality of elongate conductors extending adjacent to each other to define the second wrap. In FIG. 12, box 92 represents the end turn segment disposed between the first and second wraps which conductively couples the single elongate conductor defining the first cross sectional area 80 to two elongate conductors defining the second cross sectional area 82.

In FIG. 12, dashed box 98 represents the end of the second wrap where the two hairpin conductors forming the second wrap are welded together to form a lead 98. Lead 98 is then connected to the appropriate electrical circuit for proper operation of electric machine 20. In other words, lead 94 represents one end of the winding and lead 98 represents the other end of the same winding. It is further noted that dashed boxes 100 represent where the free ends of two hairpin conductors 40 are welded together at intermediate locations on the first wrap. Similarly, dashed boxes 102 represent where the free ends of four hairpin conductors 41 are welded together at intermediate locations of the second wrap. As discussed above, the opposing legs of the hairpin conductors are radially offset, thus, as the winding circumscribes the stator core, it alternates between layer positions.

More specifically, in the first layer, the opposing legs of the hairpin conductors alternate between the outermost radial layer and the second most radially outward layer. When the second wrap begins, the two hairpin conductors 41 forming the winding alternate between the two radially innermost layers and the third and fourth radially innermost layers.

In the illustrated embodiment, each phase of the three phase machine requires more than a single stator winding that extends for two wraps. To provide the necessary windings, additional windings, each extending for two wraps, are provided and each of the separate windings for each individual phase are connected in parallel.

Alternatively, the individual windings could extend for more than two wraps. For example, the large hairpins could extend for two wraps and then be connected to the small hairpins which extend for two wraps to thereby reduce the number of windings required per phase. Various other combinations of winding lengths and number of windings per phase may also employed. In this regard, it is noted that the use of the terms "first wrap" and "second wrap," as used herein, does not imply a particular order or arrangement and the use of these terms is merely to distinguish one wrap from another wrap.

In the illustrated embodiment, each stator winding 38 includes at least one end turn wherein a single hairpin conductor 40 is conductively coupled to two smaller hairpin conductors 41 and the hairpin conductors define only two different cross sectional areas 80, 82.

While the illustrated embodiment connects two smaller hairpin conductors to a single larger hairpin conductor, alternative embodiments could differ. For example, after forming a first wrap, the larger hairpin conductor could be connected to three smaller hairpin conductors which then extend together to define a second wrap. In such an embodiment, the three smaller hairpin conductors would need to have a cross sectional size that is closer to ⅓ the size of the larger hairpin conductor to which they are connected to make efficient use of material and slot space while also providing the first and second wraps with roughly equivalent electrical current carrying capacities.

Additionally, while the illustrated embodiment has windings which define only two different cross sectional areas, alternative embodiments could use windings defining a larger number of cross sectional areas.

For example, each winding could include a large cross sectional wire that extends for one wrap that is then connected to two intermediate size cross sectional wires that extends for one or more wraps, and then the two intermediate size wires could be connected to three wires having a still smaller cross sectional area and that extend for one more wraps. Such an arrangement could be beneficial in a large electric machine having a large number of radial layers. In such embodiments, the windings are advantageously arranged such that the axially extending segments having a larger cross sectional area are disposed radially outwardly of the axially extending segments having a smaller cross sectional area in each of the plurality of slots. This arrangement with the larger wires disposed at a greater radial distance from the smaller wires facilitates the efficient operation of the electric machine at higher rotational speeds by addressing the skin effect while also facilitating the cost efficient manufacture of hairpin conductor electrical machines by using relatively large wires in the outer radial layers to reduce the total number of welds required to manufacture the stator.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
a rotor operably coupled with a stator wherein the stator includes a stator core defining a plurality of axially extending slots and a plurality of stator windings;
wherein each stator winding defines a continuous electrical conductor having a plurality of axially extending segments, each of the axially extending segments being disposed within one of the slots, and a plurality of end turn segments connecting a pair of the axially extending segments disposed in separate slots;
wherein at least one first axially extending segment and at least two second axially extending segments are disposed in each of the plurality of slots with the first axially extending segment in each of the plurality of slots defining a first cross sectional area in a plane perpendicular to a lengthwise extending centerline of the first segment and the second axially extending segments in each of the plurality of slots defining a second cross sectional area in a plane perpendicular to a lengthwise extending centerline of the second segment wherein the first cross sectional area is larger than the second cross sectional area;
wherein at least one of the plurality of end turn segments conductively couples a single first axially extending segment in a first one of the plurality of slots to at least two second axially extending segments in a second one of the plurality of slots;
wherein each of the plurality of windings are defined by a plurality of hairpin conductors, the hairpin conductors each having a central portion defining one of the end turn segments and a pair of opposing legs extending from the central portion, each of the opposing legs defining one of the axially extending segments and a free end, the free ends each defining a portion of an end turn segment with the free ends of adjacent hairpin conductors being welded together to define one of the plurality of end turn segments; and
wherein each hairpin conductor has a consistent cross sectional area in planes perpendicular to lengthwise extending centerlines of the hairpin conductors for an entire length of each hairpin conductor and wherein the at least one end turn segment is formed by welding a free end of a first hairpin conductor to two free ends of second hairpin conductors wherein the central portion and each of the opposing legs of the first hairpin conductor are configured to define the first cross sectional area in planes perpendicular to a lengthwise extending centerline of the first hairpin conductor and the central portions and each of the opposing legs of each of the second hairpin conductors are configured to define the second cross sectional area in planes perpendicular to a lengthwise extending centerline of the second hairpin conductor.

2. The electric machine of claim 1 wherein the first axially extending segments are disposed radially outwardly of the second axially extending segments in each of the plurality of slots.

3. The electric machine of claim 1 wherein the plurality of windings define only two different cross sectional areas in planes perpendicular to lengthwise extending centerlines of the windings.

4. The electric machine of claim 1 wherein the hairpin conductors are arranged such that all of the welded free ends are located on one axial end of the stator core.

5. The electric machine of claim 4 wherein the free end of the first hairpin conductor opposite the free end welded to the two free ends of the second hairpin conductors is welded to a single hairpin conductor configured to define a consistent cross sectional area equivalent to the first cross sectional area in a plane perpendicular to a lengthwise extending centerline of the hairpin conductor for an entire length of the single hairpin conductor; and
wherein the two second hairpin conductors have free ends opposite the free ends welded to the first hairpin conductor that are both welded to two free ends of a pair of hairpin conductors that are configured to define consistent cross sectional areas equivalent to the second cross sectional area in planes perpendicular to lengthwise extending centerlines of the pair of hairpin conductors for the entire length of the pair of hairpin conductors.

6. The electric machine of claim 1 wherein the plurality of windings define only two different cross sectional areas in planes perpendicular to lengthwise extending centerlines of the windings and there are two second axially extending segments for each first axially extending segment in each of the plurality of slots.

7. The electric machine of claim 6 wherein the first axially extending segments are disposed radially outwardly of the second axially extending segments in each of the plurality of slots.

8. The electric machine of claim 1 wherein each of the axially extending segments define a cross section in a plane perpendicular to a lengthwise extending centerline of the segment wherein the cross section has four major edges wherein the four major edges define two pair of parallel edges wherein the two pairs of edges are disposed at a right angle to each other.

* * * * *